United States Patent
Yasuda

(10) Patent No.: US 11,187,343 B2
(45) Date of Patent: Nov. 30, 2021

(54) FLUID CONTROL VALVE AND FLUID CONTROL DEVICE

(71) Applicant: HORIBA STEC, Co., Ltd., Kyoto (JP)

(72) Inventor: Tadahiro Yasuda, Irvine, CA (US)

(73) Assignee: HORIBA STEC, Co., Ltd., Kyoto (JP)

( * ) Notice: Subject to any disclaimer, the term of this patent is extended or adjusted under 35 U.S.C. 154(b) by 0 days.

(21) Appl. No.: 16/282,595

(22) Filed: Feb. 22, 2019

(65) Prior Publication Data
US 2019/0271403 A1    Sep. 5, 2019

(30) Foreign Application Priority Data
Mar. 2, 2018 (JP) ............... JP2018-037138

(51) Int. Cl.
| F16K 27/02 | (2006.01) |
| F16K 31/06 | (2006.01) |
| F16K 31/126 | (2006.01) |
| F16K 7/12 | (2006.01) |
| F16K 31/365 | (2006.01) |

(52) U.S. Cl.
CPC ............ *F16K 27/0236* (2013.01); *F16K 7/12* (2013.01); *F16K 31/0655* (2013.01); *F16K 31/126* (2013.01); *F16K 31/365* (2013.01); *F23N 2235/12* (2020.01)

(58) Field of Classification Search
CPC ........ F16K 7/12; F16K 31/126; F16K 31/365; F16K 27/0236; F23N 2235/12
USPC ....................................................... 137/553
See application file for complete search history.

(56) References Cited

U.S. PATENT DOCUMENTS

| 3,719,343 A | * | 3/1973 | Werra ................ F16K 7/126 |
| | | | 251/61.1 |
| 4,114,851 A | * | 9/1978 | Shivak .................. F16K 1/38 |
| | | | 251/122 |
| 5,144,977 A | * | 9/1992 | Eggerton ........... F16K 37/0033 |
| | | | 137/554 |
| 5,609,324 A | * | 3/1997 | Pinkney .................. E03B 9/02 |
| | | | 251/292 |
| 2004/0206401 A1 | * | 10/2004 | Hecking ............ G05D 16/0661 |
| | | | 137/505.18 |

(Continued)

FOREIGN PATENT DOCUMENTS

JP    2017003571 A    1/2017

*Primary Examiner* — Angelisa L. Hicks
(74) *Attorney, Agent, or Firm* — Alleman Hall Creasman & Tuttle LLP

(57) ABSTRACT

The present invention intends to make it hard to distort a diaphragm at the time of assembling in a fluid control valve structured to screw a screw member to a plunger. The fluid control valve that makes an actuator move a valve body installed movably in a contacting/separating direction with respect to a valve seat includes: the plunger that is interposed between the valve body and the actuator to transfer the power of the actuator to the valve body; and the diaphragm connected to the circumferential surface of the plunger. In addition, the plunger includes: a first division body connected to the diaphragm; and a second division body that is arranged on an actuator side of the first division body and to which the screw member is screwed. Further, the second division body is configured to be rotatable with respect to the first division body in its circumferential direction.

8 Claims, 6 Drawing Sheets

(56) References Cited

U.S. PATENT DOCUMENTS

2009/0072173 A1\* 3/2009 Hasunuma .............. F16K 31/04
  251/129.12
2016/0313141 A1\* 10/2016 Lowery .................... G01F 1/00

\* cited by examiner

FLUID CONTROL VALVE AND FLUID CONTROL DEVICE

TECHNICAL FIELD

The present invention relates to a fluid control valve and a fluid control device.

BACKGROUND ART

As a fluid control valve used in a fluid control device (so-called mass flow controller), there has been one including: a valve seat; a valve body adapted to move in a contacting/separating direction with respect to the valve seat; an actuator for moving the valve body; a plunger interposed between the valve body and the actuator to transfer the power of the actuator to the valve body; and a diaphragm that constitutes at least a part of a valve chamber accommodating the valve body and is connected to the circumferential surface of the plunger.

In the conventional fluid control valve described above, for design reasons and the like, a screw member is screwed to the plunger in some cases, and, for example, Patent Literature 1 discloses one structured to screw a target member constituting a position sensor to a plunger with a screw member.

However, as described above, since the plunger is connected to a filmy diaphragm, when tightening the screw member to the plunger, the resulting tightening force transfers to the diaphragm, and the diaphragm may be distorted. In addition, the distortion of the diaphragm changes depending on the degree of tightening of the screw member at the time of assembling, and therefore product reproducibility gets worse to thus cause the control variation of a flow rate for each product.

Also, in the conventional fluid control valve described above, the plunger wholly moves to an actuator side depending on the restoring force of the diaphragm. For this reason, a load on the diaphragm increases to cause damage to the diaphragm, and also cause a reduction in the responsiveness of the fluid control valve.

CITATION LIST

Patent Literature

Patent Literature 1: Japanese Unexamined Patent Application Publication No. 2017-3571

SUMMARY OF INVENTION

Technical Problem

Therefore, the present invention mainly intends to make it hard for a diaphragm to be distorted at the time of assembling in a fluid control valve structured to screw a screw member to a plunger. In addition, the present invention also intends to provide a fluid control valve structured to reduce a load on a diaphragm generated when a plunger moves to an actuator side.

Solution to Problem

That is, the fluid control valve according to the present invention is one that makes an actuator move a valve body installed movably in a contacting/separating direction with respect to a valve seat, and includes: a plunger that is interposed between the valve body and the actuator to transfer power of the actuator to the valve body; and a diaphragm connected to the circumferential surface of the plunger. In addition, the plunger includes: a first division body connected to the diaphragm; and a second division body that is arranged on the actuator side of the first division body and to which a screw member is screwed. Further, the second division body is configured to be rotatable with respect to the first division body in its circumferential direction.

In such a configuration, when tightening the screw member to the second division body or when loosening the screw member from the second division body, the second division body rotates with respect to the first division body in its circumferential direction, and therefore force generated by the rotation of the screw member is not directly transferred to the diaphragm, thus making it possible to suppress the diaphragm from being distorted.

In addition, when dividing the plunger in two or more places between the diaphragm and the actuator, in other words, when dividing the plunger into three or more portions between the diaphragm and the actuator, the second division body is not necessarily required to be a division body arranged adjacent to the first division body, but may be a division body arranged sandwiching one or more division bodies with the first division body.

Also, the fluid control valve may further include a position sensor that outputs an output value indicating the position of the valve body with respect to the valve seat. In addition, in this case, the position sensor may be one that includes: a first sensor part that is fixed so as to prevent a position relative to the valve seat from changing; and a second sensor part that is fixed to the plunger via the screw member, and outputs the output value on the basis of the relative position between the first sensor part and the second sensor part.

In such a configuration, the position sensor can be firmly fixed to the plunger in such a manner as to prevent positional displacement, thus making it possible to improve the accuracy of the position sensor.

Also, the fluid control valve may further include an elastic body that presses the second division body toward the actuator side, and the elastic body may be one configured to press the second division body in a state where the plunger moves so as to deflect the diaphragm toward the valve body side.

In such a configuration, when the plunger moves to the actuator side, the movement of the second division body to the actuator side is assisted by the elastic body, and this eliminates the need to move the whole of the plunger to the actuator side by the restoring force of the diaphragm. Accordingly, the load on the diaphragm reduces, and as a result, the diaphragm can be suppressed from being damaged.

Further, the second division body may be one configured to be slidable with respect to the first division body in an axial direction of the plunger by a predetermined distance.

In such a configuration, when the elastic body moves the second division body to the actuator side, the force of the elastic body is accommodated by the sliding operation of the second division body with respect to the first division body and hard to be directly transferred to the diaphragm. As a result, the diaphragm can be suppressed from being damaged.

Also, a specific configuration may be one in which: the plunger is divided into multiple division bodies including the first division body and the second division body; the second division body is one connecting to one other division body adjacent to the second division body; any one of the second division body and the one other division body is provided with a connecting convex part, and the other is provided with a connecting concave part connected with the connecting convex part; any one of an outer circumferential surface of the connecting convex part and the inner circumferential surface of the connecting concave part is provided with a fitting piece, and the other is provided with a fitting groove into which the fitting piece is fitted; at least one of the fitting piece and the fitting groove is formed in such a manner as to circle in a circumferential direction of the plunger; and the second division body is configured to, with the connecting convex part and the connecting concave part connected to each other and the fitting piece and the fitting groove fitted to each other, rotate along the fitting piece or the fitting groove provided to the one other division body. In this case, the width of the fitting groove in the axial direction of the plunger is larger by a predetermined distance than the width of the fitting piece in the axial direction of the plunger, and the second division body may be one configured to, with the connecting convex part and the connecting concave part connected to each other and the fitting piece and the fitting groove fitted to each other, slide by the predetermined distance along the fitting piece or the fitting groove provided to the one other division body.

Further, the present invention includes a fluid control device including any of the above-described fluid control valves.

Advantageous Effects of Invention

According to the fluid control valve configured as described above, in the fluid control valve structured to screw the screw member to the plunger, the diaphragm is hard to be distorted at the time of assembling, and therefore product reproducibility is improved, thus making is possible to suppress the control variation of a flow rate for each product. Also, the load on the diaphragm generated when the plunger moves to the actuator side can be reduced to suppress the diaphragm from being damaged.

DESCRIPTION OF EMBODIMENTS

In the following, the fluid control valve according to the present invention and a fluid control device using the fluid control valve will be described on the basis of the drawings.

The fluid control device according to the present invention is a so-called mass flow controller used in a semiconductor manufacturing process. In addition the fluid control device according to the present invention can be used not only in the semiconductor manufacturing process but also in other processes.

First Embodiment

Figure 1:
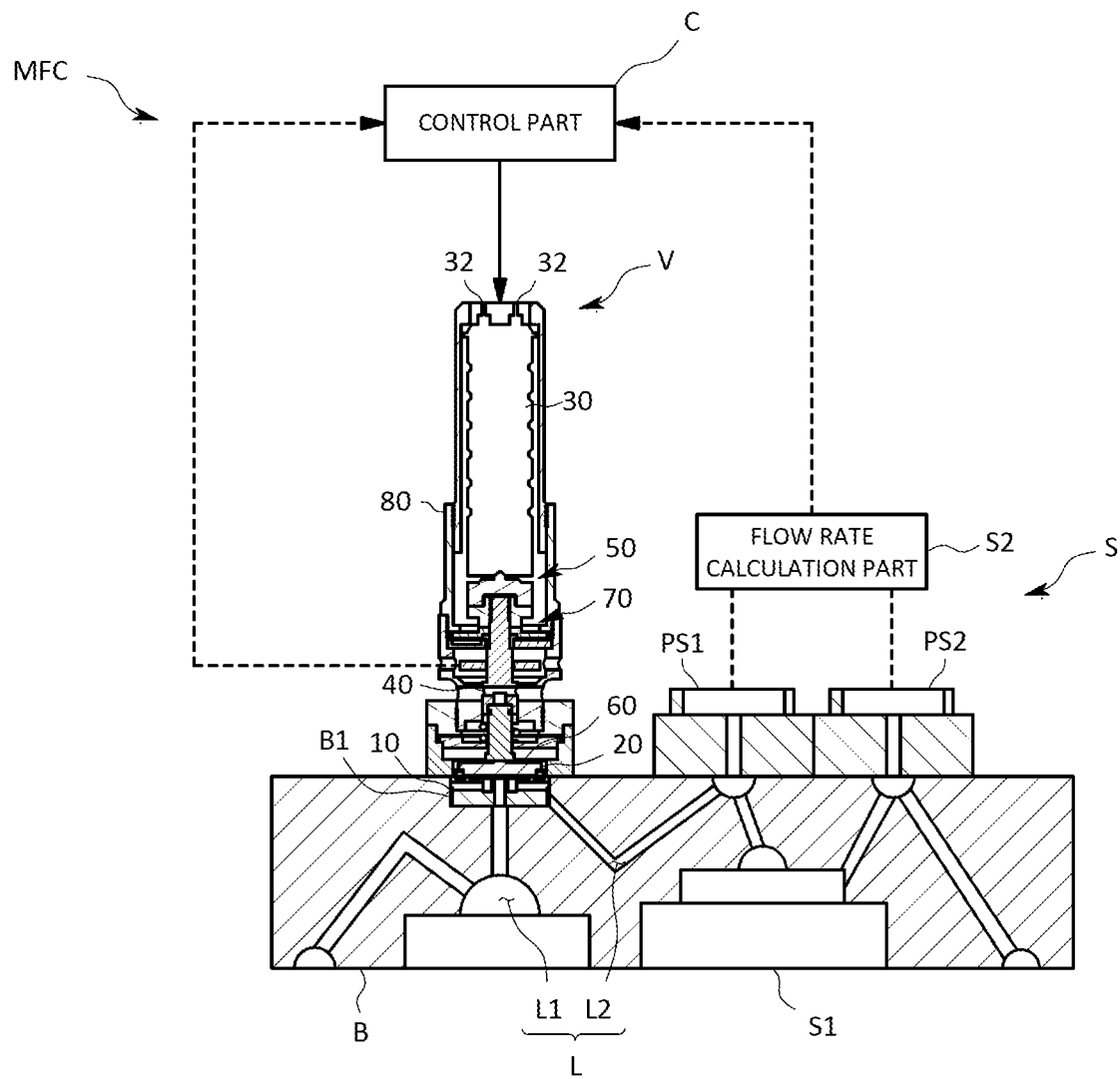
FIG. 1 is a schematic diagram illustrating the overall configuration of a fluid control device according to a first embodiment.

As illustrated in FIG. 1, a fluid control device MFC according to the present embodiment is a pressure type one. Specifically, the fluid control device MFC includes: a block body B inside which a flow path L is provided; a fluid control valve V installed on the block body B; paired pressure sensors PS1 and PS2 installed on the downstream side of the fluid control valve V on the block body B; and a control part C that feedback-controls the fluid control valve V so that the flow rate value of fluid through the flow path L calculated on the basis of pressure values measured by the paired pressure sensors PS1 and PS2 comes close to a predetermined target value.

The block body B is a rectangular-shaped one, whose predetermined surface is installed with the fluid control valve V and the paired pressure sensors PS1 and PS2. Also, the block body B is provided with a concave accommodation part B1 for installing the fluid control valve V on the predetermined surface of the block body B, and the accommodation part B1 divides the flow path L into an upstream side flow path L1 and a downstream side flow path L2. In addition, in the accommodation part B1, one end of the upstream side flow path L1 is opened in the bottom surface thereof, and one end of the downstream side flow path L2 is opened in the side surface thereof.

The paired pressure sensors PS1 and PS2 are respectively connected to the upstream and downstream sides of a laminar flow element S1 in the flow path L, and both connected to a flow rate calculation part S2 that calculates the flow rate on the basis of the outputs of the first and second pressure sensors PS1 and PS2 provided in a pair. The paired pressure sensors PS1 and PS2 are, together with the fluid control valve V, arranged in line and attached on the predetermined surface of the block body B.

The fluid control valve V is one of a so-called normally opened type. Specifically, the fluid control valve V includes: a valve seat 10 fitted into the accommodation part B1 of the block body B; a valve body 20 installed movably in a contacting/separating direction with respect to the valve seat 10; an actuator 30 for moving the valve body 20; a plunger 40 interposed between the valve body 20 and the actuator 30 to transfer the power of the actuator 30 to the valve body 20; a connecting mechanism 50 interposed between the actuator 30 and the plunger 40 to connect the plunger 40 to the actuator 30; a filmy diaphragm 60 that constitutes a part of a valve chamber VR accommodating the valve body 20 and is integrally connected to the plunger 40; and a position sensor 70 installed on the plunger 40 to output an output value indicating the position of the valve body 20 with respect to the valve seat 10.

Also, the fluid control valve V includes a substantially tubular-shaped casing 80 that accommodates the actuator 30 and the plunger 40 in its internal space and is installed on the predetermined surface of the block body B. The casing 80 is divided into multiple parts in consideration of assembling, and the respective parts are connected by screwing, caulking, or the like. In addition, the casing 80 is provided on one side thereof with a concave part 81 formed by allowing the diaphragm 60 to separate the internal space. Further, the casing 80 is configured to allow the concave part 81 provided on one end side thereof to form the valve chamber VR by, with the valve seat 10 fitted into the accommodation part B1 of the block body B, bringing the one end of the casing 80 into close contact with the predetermined surface in such a manner as to block the accommodation part B1. Accordingly, a part of the inner surfaces of the valve chamber VR, specifically, the surface opposite to the valve seat 10 is formed of the diaphragm 60. In addition, the fluid control valve V is adapted to transfer the power of the actuator 30 to the valve body 20 via the plunger 40 using the deflection of the diaphragm 60 while maintaining the airtightness of the valve chamber VR.

Figure 2:
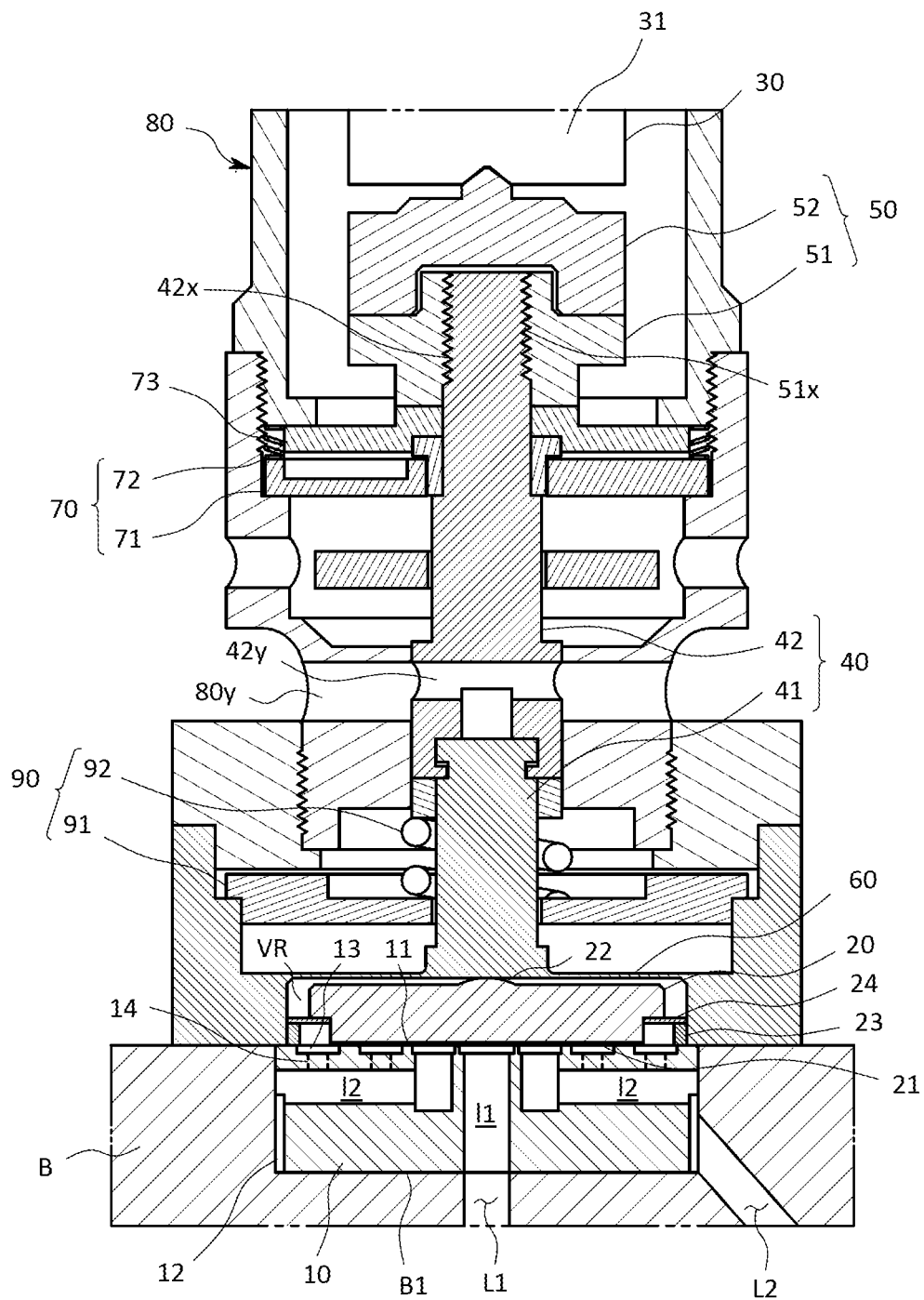
FIG. 2 is a partial schematic diagram illustrating the configuration of a fluid control valve according to the first embodiment.
Figure 3:
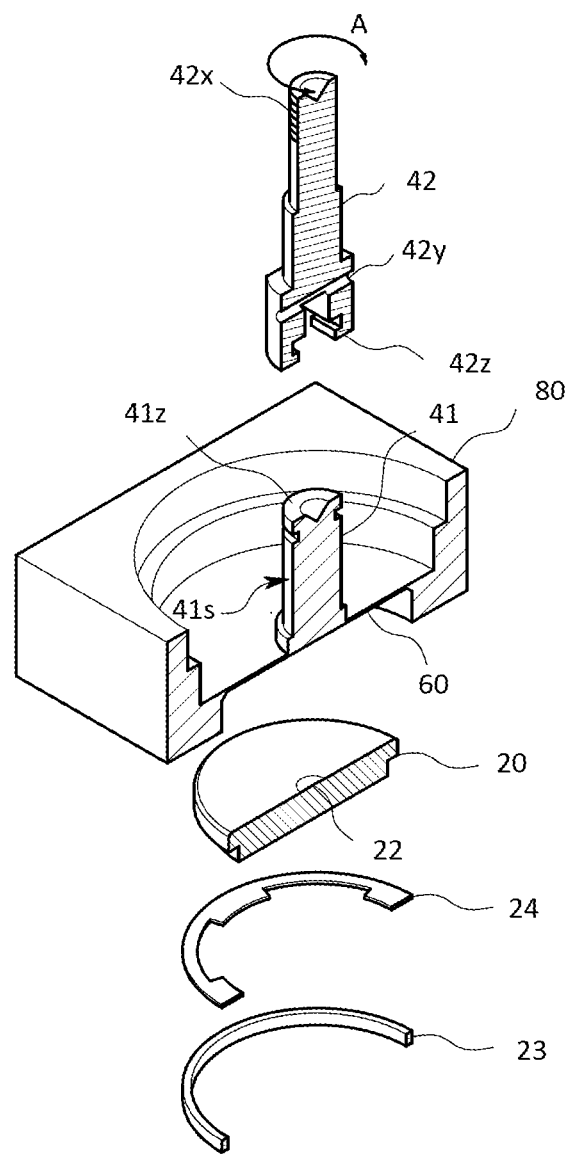
FIG. 3 is a cross-sectional perspective view illustrating a state where some parts constituting the fluid control valve according to the first embodiment are decomposed.
Figure 4:
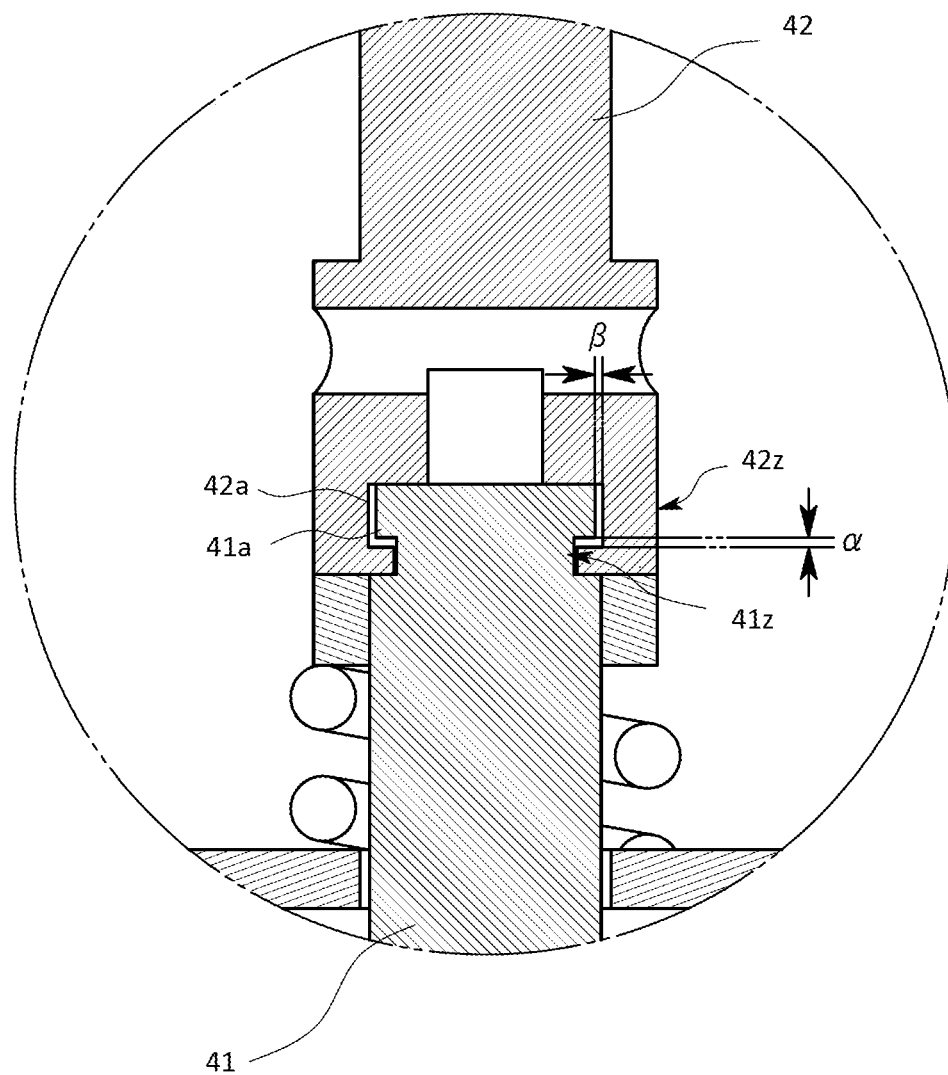
FIG. 4 is an enlarged schematic diagram illustrating a part of a plunger constituting the fluid control valve according to the first embodiment.

Next, respective members constituting the fluid control valve V according to the present embodiment will be described in detail on the basis of FIGS. 2 to 4. Note that FIG. 3 illustrates parts constituting the fluid control valve V, in particular, only parts constituting the plunger 40, valve body 20, and their periphery.

The valve seat 10 is a block-shaped one fitted into the accommodation part B1 of the block body B. In addition, a surface of the valve seat 10 facing in the same direction as that of the predetermined surface of the block body B with the valve seat 10 fitted into the accommodation part B1 of the block body B is a valve seat surface 11, and the valve seat surface 11 includes a part of the inner surfaces of the valve chamber VR. Also, inside the valve seat 10, a first flow path 11 communicating with the upstream side flow path L1 and multiple second flow path 12 communicating with the downstream side flow path L2 are provided.

The first flow path 11 is such that one end thereof is opened in the center of the valve seat surface 11 and also the other end thereof is opened in a surface opposite to the bottom surface of the accommodation part B1. Also, the second flow paths 12 are such that one ends thereof are opened concentrically around the center of the valve seat surface 11 and also the other ends thereof are opened in an outer surface opposite to an inner surface of the accommodation part B1. Further, the outer surface of the valve seat 10 is stepwise, whose valve seat surface 11 side is adapted to be in close contact with the inner surface of the accommodation part B1 and whose surface side opposite to the valve seat surface 11 is adapted to be opposite to the inner surface of the accommodation part B1 with a clearance 12 kept. In doing so, in the state where the valve seat 10 is fitted into the accommodation part B1 of the block body B, the first flow path L1 communicates with the upstream side flow path 11, and also the second flow path L2 communicates with the downstream side flow paths 12 via the clearance 12.

The valve seat surface 11 is formed with multiple conduction grooves 13 concentrically around the center thereof. In addition, in each of the conduction grooves 13, multiple conduction holes 14 communicating with the second flow paths 12 are arranged at regular intervals. This allows the fluid accumulating in the valve chamber VR to be uniformly led out to the second flow paths 12.

The valve body 20 is a filmy one having a flat seating surface 21 opposite to the valve seat surface 11. In addition, the surface of the valve body 20 opposite to the diaphragm 60, which is the surface opposite to the seating surface 21, is provided with an inclination suppressing protrusion 22 having a curved surface shape (specifically, a spherical surface shape). Further, the inclination suppressing protrusion 22 is provided opposite to the plunger 40 connected to the diaphragm 60. Also, the valve body 20 is supported by the valve seat surface 11 via an annular leaf spring 24 placed on a support ring 23 installed on the valve seat surface 11. This allows the valve body 20 to be repelled by the leaf spring 24 against pressing force on the valve seat 10 side.

The actuator 30 includes: a piezo stack 31 made by stacking multiple piezo elements; and terminals 32 (see FIG. 1) for applying voltage (or current) to the piezo stack 31. In addition, the actuator 30 is held on the other side of the casing 80, and configured so that the piezo stack 31 is extended toward the one end side of the casing 80 by the voltage applied via the terminals 32.

The plunger 40 is a rodlike one whose one end is formed integrally with the diaphragm 60 and whose other side is a rodlike member extending toward the actuator 30 side. In addition, the plunger 40 is divided between the diaphragm 60 and the actuator 30, and includes: a first division body 41 connected to the diaphragm 60; and a second division body 42 arranged on the actuator 30 side of the first division body 41.

The circumferential surface 41s of the first division body 41 on the valve body 20 side is integrally formed with the diaphragm 60. Note that the circumferential surface 41s is a surface along a circumferential direction A illustrated in FIG. 3. In addition, the first division body 41 is configured so that the fore end surface thereof on the valve body side 20 comes into point contact with the inclination suppressing protrusion 22 of the valve body 20. Further, the first division body 41 is provided on the actuator 30 side thereof with a connecting convex part 41z connected to the second division body 42.

The circumferential surface of the second division body 42 on the actuator 30 side is formed with a screw groove 42x. In addition, the second division body 42 is connected to the actuator 30 via the connecting mechanism 50 on the actuator 30 side thereof. Specifically, the connecting mechanism 50 includes: a substantially nut-shaped screw member 51 provided with a screw hole 51x into which the screw groove 42x of the second division body 42 is fitted; and a contact member 52 mutually fitted to the screw member 51 to contact with the actuator 30, and the second division body 42 is connected to the actuator 30 via these members 51 and 52. Also, the second division body 42 is provided with a connecting concave part 42z connected to the first division body 41 on the valve body 20 side thereof.

In addition, the screw member 51 and the contact member 52 are connected so that they can mutually slide in a direction intersecting with (direction orthogonal to) the axial direction of the plunger 40. In doing so, axial displacement in the direction orthogonal to the axial direction caused by manufacturing and assembling errors of the respective members can be accommodated.

Further, the second division body 42 is formed with a first pin hole 42y penetrating in the direction orthogonal to the axial direction thereof. In addition, the casing 80 also has a second pin hole 80y penetrating through the side surface opposite to the first pin hole 42y. As a result, the second division body 42 is adapted to be capable of being restricted from rotating in the circumferential direction thereof with respect to the casing 80 by inserting a pin (not illustrated) into the first pin hole 42y and the second pin hole 80y.

Also, the second division body 42 is structured to be pressed toward the actuator 30 side by a pressing mechanism 90. Specifically, the pressing mechanism 90 includes: a support member 91 held preventing positional displacement inside the casing 80; and an elastic body 92 (e.g., a coil spring) through which the first division body 41 is passed and whose one end is supported by the support member 91. In addition, the second division body 42 is adapted to be pressed toward the actuator 30 side by the elastic body 92 when the plunger 40 is pressed by the actuator 30 to move to the valve body 20 side and thereby the diaphragm 60 is deflected toward the valve chamber VR side.

Next, the connecting structure between the first division body 41 and the second division body 42 will be described in detail on the basis of FIG. 4.

The first division body 41 and the second division body 42 are configured to connect to each other via the connecting convex part 41z and connecting concave part 42z. The connecting convex part 41z is formed in a cross-sectionally T shape. The connecting convex part 41z is provided on the outer circumferential surface thereof with a fitting piece 41a. In addition, the fitting piece 41a is formed in a shape rotationally symmetric around an axis extending in the axial direction of the plunger 40, and this allows the shape to circle in the circumferential direction of the plunger 40. Also, the connecting concave part 42z is formed in a cross-sectionally T shape, and penetrates from one side surface to a surface opposite to the one side surface. The connecting concave part 42z is provided in the inner circumferential surface thereof with a fitting groove 42a into which the fitting piece 41a is fitted.

In addition, the width of the fitting groove 42a in the axial direction of the plunger 40 is longer than the width of the fitting piece 41a in the axial direction by a predetermined distance α. Further, the diameter of the fitting groove 42a in the direction orthogonal to the axial direction of the plunger 40 is longer than the diameter of the fitting piece 41a in the orthogonal direction by a predetermined distance β.

The first division body 41 and the second division body 42 are configured to be connectable by sliding the connecting convex part 41z to fit it into the connecting concave part 42z, and at this time, the fitting piece 41a is in a state of being fitted into the fitting groove 42a. In addition, the second division body 42 is configured to slide the fitting groove 42a along the fitting piece 41a by fitting the fitting piece 41a and the fitting groove 42a to each other, and freely rotate in the circumferential direction of the second division body 42 (in the arrow A direction in FIG. 3). In other words, the second division body 42 is adapted to be rotatable in a tightening direction and a loosening direction of the screw member 51 with respect to the first division body 41. Also, the second division body 42 is configured to slide the fitting groove 42a in the axial direction of the plunger 40 along the fitting piece 41a and slide by the predetermined distance α by fitting the fitting piece 41a and the fitting groove 42a to each other. Further, the second division body 42 is configured to slide the fitting groove 42a in the direction orthogonal to the axial direction of the plunger 40 along the fitting piece 41a and be slidable by the predetermined distance β by fitting the fitting piece 41a and the fitting groove 42a to each other.

The diaphragm 60 is one that is formed in such a manner as to separate the internal space of the casing 80 and plays a role in transmitting the movement of the plunger 40 to the valve body 20 while maintaining the airtightness of the valve chamber VR.

The position sensor 70 is one that outputs the output value indicating the position of the seating surface 21 of the valve body 20 with respect to the valve seat surface 11 of the valve seat 10. In addition, the position sensor 70 includes: a first sensor part 71 fixed to the casing 80 so that a relative position to the valve seat surface 11 of the valve seat 10 does not change; and a second sensor part 72 fixed to the second division body 42, and is configured to output, as the output value, a value based on the relative position (relative distance) between the first sensor part 71 and the second sensor part 72 serving as a target for it. In addition, the first sensor part 71 is constantly pressed toward the valve seat 10 side by a leaf spring 73 supported by the casing 80, and in doing so, positional displacement is suppressed. Also, the second sensor part 72 is fixed to the second division body 42 via the screw member 51 so as to prevent positional displacement. In doing so, the positions of the respective members constituting the position sensor 70 are fixed, and thereby the detection accuracy of the position sensor 70 is improved.

The control part C has a so-called computer including a CPU, a memory, A/D and D/A converters, and the like, and is adapted to implement the above-described respective functions by executing a program stored in the memory to make various types of equipment cooperate. Specifically, the control part C is one that feedback-controls the fluid control valve V using the output value of the position sensor 70 so that the flow rate value calculated by the flow rate calculation part S3 comes close to the target value preliminarily stored in the memory.

Next, the operation of the fluid control valve V according to the present embodiment will be described.

In the fluid control valve V, when the voltage is not applied to the actuator 30, a valve opening level (the distance between the valve seat surface 11 of the valve seat 10 and the seating surface 21 of the valve body 20) is set to have a predetermined value. Note that when the valve opening level has the predetermined value, the fluid control valve V is in a fully opened state.

Then, when the voltage is applied to the actuator 30, the actuator 30 is extended. As a result, power associated with the extension of the actuator 30 is transferred to the valve body 20 in the order of the connecting mechanism 50, the second division body 42 (plunger), and the first division body 41 (plunger), and the valve body 20 is moved in a direction to contact with (in a direction to come close to) the valve seat 10 while resisting the pressing force of the leaf spring 24. This allows the valve opening level to have a smaller value than the predetermined value. In addition, the extension of the actuator 30 increases as an applied voltage value (or current value) is increased, and therefore by adjusting the magnitude of the voltage value, the valve opening level can be controlled.

Subsequently, when the voltage applied to the actuator 30 decreases, the actuator 30 is contracted. As a result, in association with the contraction of the actuator 30, the valve body 20 is moved in a direction to separate from (in a direction to get away from) the valve seat 10 by the pressing force of the leaf spring 24. This allows the valve opening level to have a large value.

In addition, when the voltage applied to the actuator 30 decreases, power associated with the contraction of the actuator 30 is adapted not to be directly transferred to the diaphragm 60. In detail, when the actuator 30 contracts, the second division body 42 is moved to the actuator 30 side by the pressing force of the elastic body 92. However, since the second division body 42 is configured to be slidable by the predetermined distance α with respect to the first division body 41, the movement of the second division body 42 is accommodated by the sliding operation and is thereby not directly transmitted to the first division body 41. In addition, the first division body 41 is moved to the actuator 30 side by the restoring force of the diaphragm 60, and also the valve body 20 is moved by the pressing force of the leaf spring 24 in a direction to separate from the valve seat 10, thus allowing the valve opening level to have a large value. This makes it hard for the force associated with the contraction of the actuator 30 to be directly transferred to the diaphragm 60, and therefore the diaphragm 60 can be suppressed from being damaged. Also, as compared with the case where the plunger 40 is integrally formed, power (the pressing force of the pressing mechanism 90 and the restoring force of the diaphragm 60) for moving the plunger 40 to the actuator 30 side increases. This allows the follow-up operation of the plunger 40 associated with the contraction movement of the actuator 30 to be sped up, thus improving the responsiveness of the fluid control valve V.

Next, the process of assembling the plunger 40 of the fluid control valve V according to the present embodiment will be described.

Basically, the fluid control valve V is assembled by making connections sequentially from members arranged on the block body B side in such a manner as to stack them. In addition, when assembling the plunger 40, the second division body 42 is first connected to the first division body 41. In this state, the pin is inserted into the first pin hole 42*y* and the second pin hole 80*y*, and thereby the second division body 42 is fixed to members constituting the casing 80 to prevent the second division body 42 from rotating. In this state, the second sensor part 72 of the position sensor 70 is fitted to the second division body 42 and then fixed by the screw member 51. In addition, in this case, even if the second division body 42 is rotated to some extent with respect to the first division body 41 by the backlash between the respective pin holes 42*y* and 80*y* and the pin, the second division body 42 is adapted to be rotatable with respect to the first division body 41 in its circumferential direction, and therefore torque generated when tightening or loosening the screw member 51 with respect to the second division body 42 is hard to be transferred to the diaphragm 60. After that, by removing the pin from the first pin hole 42*y* and second pin hole 80*y*, the plunger 40 is made movable with respect to the casing 80.

Further, the widths of the fitting groove 42*a* of the second division body 42 in the axial direction of the plunger 40 and in the direction orthogonal to the axial direction are both larger than those of the fitting piece 41*a* of the first division body 41. For this reason, the first division body 41 and the second division body 42 are adapted to be able to accommodate the inclination of the valve body 20 even in the connection part therebetween.

Other Embodiments

In the above-described first embodiment, the plunger 40 is divided in one place on the actuator 30 side of the diaphragm 60, but may be divided in two or more places. In this case, a division body arranged adjacent to the first division body 41 connected to the diaphragm 60 is not necessarily required to be set to the second division body 42, and a division body arranged sandwiching another division body with the first division body 41 may be set to the second division body 42.

Figure 5:
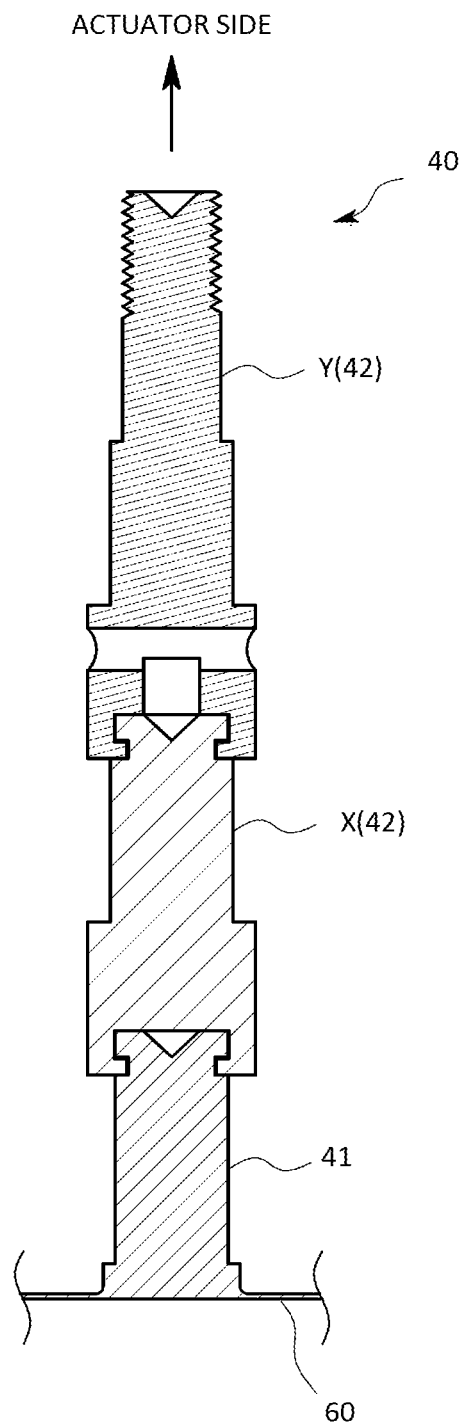
FIG. 5 is a schematic diagram illustrating a plunger according to another embodiment.

For example, as illustrated in FIG. 5, when the plunger 40 is divided on the actuator 30 side of the diaphragm 60 in two places, a division body X arranged adjacent to the first division body 41 may be the second division body 42, or a division body Y arranged sandwiching the division body X with the first division body 41 may be the second division body 42. In addition, in the former case, the division body Y positioned on the actuator 30 side of the division body X as the second division body 42 also operate with respect to the first division body 41 as with the division body X. Accordingly, in this case, the division body Y can also be said to be a part of the second division body 42.

Figure 6:
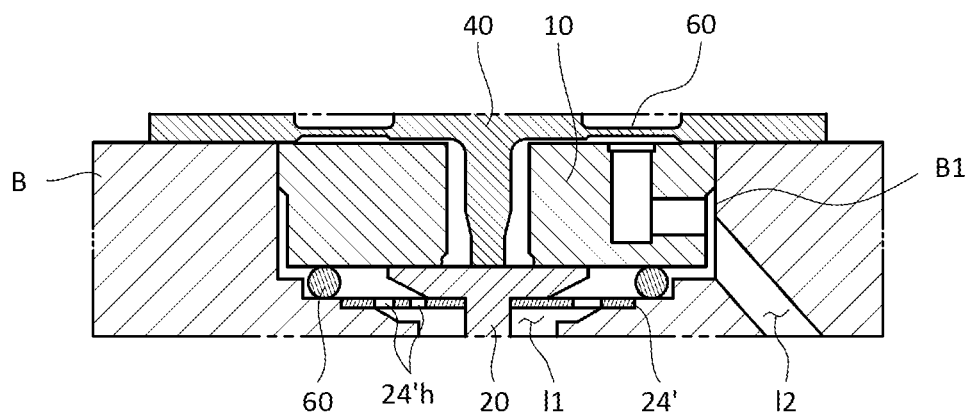
FIG. 6 is an enlarged schematic diagram illustrating the vicinity of a valve body of a fluid control valve according to another embodiment.

Also, in the above-described first embodiment, the present invention is described while exemplifying the fluid control valve V of a normally opened type, but can also be applied to a fluid control valve of a normally closed type. For example, as illustrated in FIG. 6, the fluid control valve of a normally closed type includes: a valve seat 10 fitted into an accommodation part B1 of a block body B; a valve body 20 installed movably in a contacting/separating direction with respect to the valve seat 10; an actuator (not illustrated) for moving the valve body 20; a plunger 40 interposed between the valve body 20 and the actuator 30 to transfer the power of the actuator 30 to the valve body 20; and a filmy diaphragm 60 connected integrally with the plunger 40. In addition, the valve body 20 is installed in the accommodation part B1 in such a manner as to be interposed between an upstream side flow path 11 of the block body B and the valve seat 10, and constantly pressed toward the valve seat 10 side by a leaf spring 24' held by the accommodation part B1. Also, the plunger 40 extends from the diaphragm 60 through the valve seat 10 in such a manner as to contact with the valve body 20. Further, in the fluid control valve V, when the valve body 20 is pressed by the plunger 40, the valve body 20 is moved in a direction to separate from the valve seat 10 while resisting the pressing force of the leaf spring 24' and a clearance is created between the valve seat 10 and the valve body 20 (the distance of the clearance serves as a valve opening level). This allows fluid flowing into the clearance from the upstream side flow path 11 via a conduction hole 24'*h* provided in the leaf spring 24' to flow into between the valve seat 10 and the diaphragm 60 and flow to a downstream side flow path 12. Accordingly, the fluid control valve V is configured to be in a fully closed state when no voltage is applied to the actuator, and to increase the valve opening level by applying voltage to the actuator.

Also, in the above-described first embodiment, as the actuator 30 of the fluid control valve V, the piezo element (piezo stack) is used, but a solenoid or the like may be used.

Further, in the above-described first embodiment, the description is given while exemplifying, as the fluid control device MFC, the mass flow controller of a type adapted to feedback-control the fluid control valve V on the basis of the output value of the position sensor 70. However, the present invention can also be applied to a mass flow controller of a type adapted to feedback-control a fluid control valve on the basis of a measured value of a thermal type or pressure type flow rate sensor.

Besides, it goes without saying that the present invention is not limited to each of the above-described embodiments but can be variously modified without departing from the scope thereof.

LIST OF REFERENCE CHARACTERS

MFC: Fluid control device
B: Block body
S: Flow rate sensor
V: Fluid control valve
10: Valve seat
20: Valve body
30: Actuator
40: Plunger
41: First division body
41*s*: Circumferential surface
41*z*: Connecting convex part
41*a*: Fitting piece
42: Second division body
42*z*: Connecting concave part 42a: Fitting groove
50: Connecting mechanism
51: Screw member
60: Diaphragm
70: Position sensor
71: First sensor part
72: Second sensor part
80: Casing
90: Pressing mechanism
91: Support member
92: Elastic body

The invention claimed is:

1. A fluid control valve that makes an actuator move a valve body installed movably in a contacting/separating direction with respect to a valve seat, the fluid control valve comprising:
   a plunger that is interposed between the valve body and the actuator to transfer power of the actuator to the valve body; and
   a diaphragm connected to a circumferential surface of the plunger, wherein
   the plunger comprises multiple division bodies including at least a first division body connected to the diaphragm, and a second division body that is arranged on an actuator side of the first division body and to which a screw member is screwed,
   the second division body is configured to be rotatable with respect to the first division body in its circumferential direction,
   the second division body is formed with a hole which prevents the second division body from rotating in its circumferential direction in a state in which a pin is inserted therein,
   the second division body is connected to an adjacent division body which is one of the multiple division bodies and is adjacent to the second division body,
   any one of the second division body and the adjacent division body is provided with a connecting convex part, and the other is provided with a connecting concave part connected with the connecting convex part, and
   a gap positioned outside in a radial direction from the connecting convex part is formed between the connecting convex part and the connecting concave part.

2. The fluid control valve according to claim 1, further comprising
   a position sensor that outputs an output value indicating a position of the valve body with respect to the valve seat.

3. The fluid control valve according to claim 2, wherein the position sensor comprises:
   a first sensor part that is fixed so as to prevent a position relative to the valve seat from changing; and
   a second sensor part that is fixed to the second division body via the screw member, and
   outputs the output value on a basis of a relative position between the first sensor part and the second sensor part.

4. The fluid control valve according to claim 1, further comprises
   an elastic body that presses the second division body toward an actuator side, wherein
   the elastic body is configured to press the second division body in a state where the plunger moves so as to deflect the diaphragm toward a valve body side.

5. The fluid control valve according to claim 4, wherein
   the second division body is configured to be slidable with respect to the first division body in an axial direction of the plunger by a predetermined distance.

6. The fluid control valve according to claim 1, wherein:
   any one of an outer circumferential surface of the connecting convex part and an inner circumferential surface of the connecting concave part is provided with a fitting piece, and the other is provided with a fitting groove into which the fitting piece is fitted;
   at least one of the fitting piece and the fitting groove is formed in such a manner as to circle in a circumferential direction of the plunger; and
   the second division body is configured to, with the connecting convex part and the connecting concave part connected to each other and the fitting piece and the fitting groove fitted to each other, rotate along the fitting piece or the fitting groove provided to the adjacent division body.

7. The fluid control valve according to claim 6, wherein
   a width of the fitting groove in an axial direction of the plunger is larger by a predetermined distance than a width of the fitting piece in the axial direction of the plunger, and
   the second division body is configured to, with the connecting convex part and the connecting concave part connected to each other and the fitting piece and the fitting groove fitted to each other, slide by the predetermined distance along the fitting piece or the fitting groove provided to the adjacent division body.

8. A fluid control device comprising the fluid control valve according to claim 1.

* * * * *